(12) United States Patent
Oba et al.

(10) Patent No.: US 8,970,735 B2
(45) Date of Patent: Mar. 3, 2015

(54) CAPTURING DEVICE, CAPTURING SYSTEM, AND CAPTURING METHOD

(75) Inventors: Eiji Oba, Tokyo (JP); Frédéric Maire, Ohnenheim (FR)

(73) Assignees: Sony Corporation, Tokyo (JP); Sony Europe Limited, Surrey (GB)

( * ) Notice: Subject to any disclaimer, the term of this patent is extended or adjusted under 35 U.S.C. 154(b) by 513 days.

(21) Appl. No.: 13/231,473

(22) Filed: Sep. 13, 2011

(65) Prior Publication Data

US 2012/0092524 A1 Apr. 19, 2012

(30) Foreign Application Priority Data

Oct. 14, 2010 (EP) ..................................... 10306117

(51) Int. Cl.
*H04N 5/76* (2006.01)
*H04N 5/232* (2006.01)

(52) U.S. Cl.
CPC ....... *H04N 5/23245* (2013.01); *H04N 5/23293* (2013.01)
USPC ........................ 348/231.99; 348/148; 348/118

(58) Field of Classification Search
CPC ..... H04N 5/772; H04N 5/907; H04N 1/2112; H04N 2101/00; H04N 9/8047
USPC ...................................... 348/231.99, 148, 118
See application file for complete search history.

(56) References Cited

U.S. PATENT DOCUMENTS

| 4,963,981 | A | 10/1990 | Todaka et al. |
| 5,754,230 | A | 5/1998 | Tsuruta |
| 2002/0001449 | A1* | 1/2002 | Sato et al. ........................ 386/46 |
| 2007/0098396 | A1 | 5/2007 | Watanabe et al. |
| 2008/0060034 | A1* | 3/2008 | Egnal et al. .................... 725/105 |
| 2010/0020176 | A1 | 1/2010 | Higashibara |
| 2010/0201817 | A1* | 8/2010 | Katoh ............................ 348/148 |
| 2011/0199511 | A1* | 8/2011 | Takahashi et al. .......... 348/231.5 |

FOREIGN PATENT DOCUMENTS

| EP | 1 981 262 | 10/2008 |
| JP | 2002-19556 | 1/2002 |
| JP | 2010 33108 | 2/2010 |

* cited by examiner

*Primary Examiner* — Twyler Haskins
*Assistant Examiner* — Fayez Bhuiyan
(74) *Attorney, Agent, or Firm* — Frommer Lawrence & Haug LLP; William S. Frommer (57) ABSTRACT

A capturing device includes: an image sensor generating an image signal; a storage unit setting a second region in a first region; a timing adjusting unit adjusting a timing at which the image signal is read out to write the image signal in the storage unit, and a timing at which the image signal is read out from the storage unit; an image conversion processing unit performing a predetermined process on the image, alternately writing a first image signal corresponding to a full image or a second image signal corresponding to a partial image in the first region in a different frame period, and writing an image signal that is different from the image signal written in the first region in the second region; and an output unit converting and outputting the first and second image signals into an image signal in a predetermined format.

9 Claims, 11 Drawing Sheets

Tie − Ti1 = 1V EFFECTIVE PERIOD
Tim − Tin VARIABLE IN SPECIFIED REGION
Toe − To1 = 1V EFFECTIVE PERIOD

CAPTURING DEVICE, CAPTURING SYSTEM, AND CAPTURING METHOD

BACKGROUND OF THE INVENTION

1. Field of the Invention

The present invention relates to a capturing device, a capturing system, and a capturing method which are suitable to be applied to, for example, a vehicle-mounted camera for capturing and displaying a location that is difficult for a driver of a vehicle to see.

2. Description of the Related Art

In the related art, a small camera is mounted on a vehicle, a rail vehicle or the like to display images taken by the camera on a display device provided in the vicinity of a driver's seat or the like (for example, refer to Japanese Unexamined Patent Application Publication Nos. 2002-19556 and 2010-33108). Using such a camera, spots that are difficult for a driver to see while driving are captured, and images of the spots obtained are displayed on a display device, thereby allowing the driver to see the spots. As the spots that are difficult for the driver to see, for example, in the case of a vehicle moving backward during parking, such spots occur at the rear of the vehicle in many cases.

In addition, in order to capture the rear of the vehicle and display this image on a vehicle-mounted monitor, a capturing system which uses a CCTV (Closed-circuit Television) monitoring device or the like for loading and displaying images output from a plurality of cameras has been used. This capturing system enhances the visibility of a plurality of images using a PinP (Picture in Picture) display function of displaying images captured in different directions on the same monitor screen. As another capturing system that is mounted on a vehicle, one that converts a part of the full image by an ECU (Electronic Control Unit) or the like for processing images output from a camera and synthesizes the converted part to be displayed as PinP using a function of disposing another screen region in a screen has been used. This capturing system loads images output from cameras via an electrical harness in an image memory in the ECU and then performs a synthesizing process on the plurality of the images transferred. Accordingly, the definition of the image displayed on the vehicle-mounted monitor depends on the band of a transferring system, so that while reducing the resolution of a transmitted image, the image is loaded in the image memory of the ECU to be synthesized as a conversion image.

SUMMARY OF THE INVENTION

However, since the vehicle-mounted camera mounted on the vehicle has to capture a wide range, a fisheye lens, an anamorphic lens, or the like is used. In a wide-angle image, detailed recognition of a localized image is difficult. In addition, although a particular spot that is desired to be preferentially viewed exists, the spot may not be recognized in detail in the image as it is or it may take time to recognize the spot.

In addition, in existing capturing systems, the definition of the image is determined depending on a transmission capacity of the harness, so that when the image is enlarged by the ECU disposed at the rear end of the camera, the image becomes rough. Moreover, the ECU has to load the full image transferred from the camera in the memory first, so that a component for the image memory is mounted on the capturing system, and a component for a synthesizing process is provided. Accordingly, the number of components for configuring the capturing system is increased, so that the capturing system has a complex configuration and thus becomes expensive.

It is desirable to allow a driver (user) to easily see an image of a localized spot that the driver particularly wants to see and an image in the vicinity thereof.

According to an embodiment of the invention, an image signal is generated by performing photoelectric conversion on light from a subject.

A storage unit sets a second region (a sub-screen storage region of PinP) in a first region (a main screen storage region of PinP) corresponding to a specified region specified by a set value used to set a range for cutting an image from the image signal.

Next, a timing at which the image signal is read out from the image sensor to write the image signal in the storage unit, and a timing at which the image signal is read out from the storage unit are adjusted.

Next, a predetermined process on the image from the image signal read out from the image sensor is performed. In addition, by adjusting the timings, frames for writing the image signal are changed for each frame to be alternately written in the first and second regions. This is performed on the first image signal corresponding to a full image from the image signal input from the image sensor to the first region, or the second image signal corresponding to a partial image which corresponds to a part of the full image. On the other hand, an image signal that is different from the image signal written in the first region is written in the second region for a frame period of the image signal.

Moreover, the first and second image signals read out from the first and second regions at continuous scanning timings are converted and output into an image signal in a predetermined format.

Accordingly, the image signals corresponding to the two types of images are stored in the single storage unit, thereby converting and outputting the two types of image signals into an image signal in a predetermined format for each frame. As this format, for example, an NTSC (National Television System Committee) format may be used.

According to the embodiment of the invention, as well as a spot (range) that the user particularly wants to see, the full image displayed as PinP may be simultaneously displayed on the same screen. Accordingly, the driver can simultaneously recognize specified spots while recognizing the state of the surroundings of a camera.

Various respective aspects and features of the invention are defined in the appended claims.

BRIEF DESCRIPTION OF THE DRAWINGS

Embodiments of the invention will now be described with reference to the accompanying drawings, throughout which like parts are referred to by like references, and in which.

DESCRIPTION OF THE PREFERRED EMBODIMENTS

Hereinafter, an exemplary embodiment of the invention (hereinafter, referred to as the embodiment) will be described. The description will be provided in the following order.

1. Embodiment (Display Control of PinP: Example of Controlling Display of PinP Using One Image Storage Unit)
2. Modified Example

1. Embodiment

Example of the Entire Configuration of Capturing System

Figure 1:
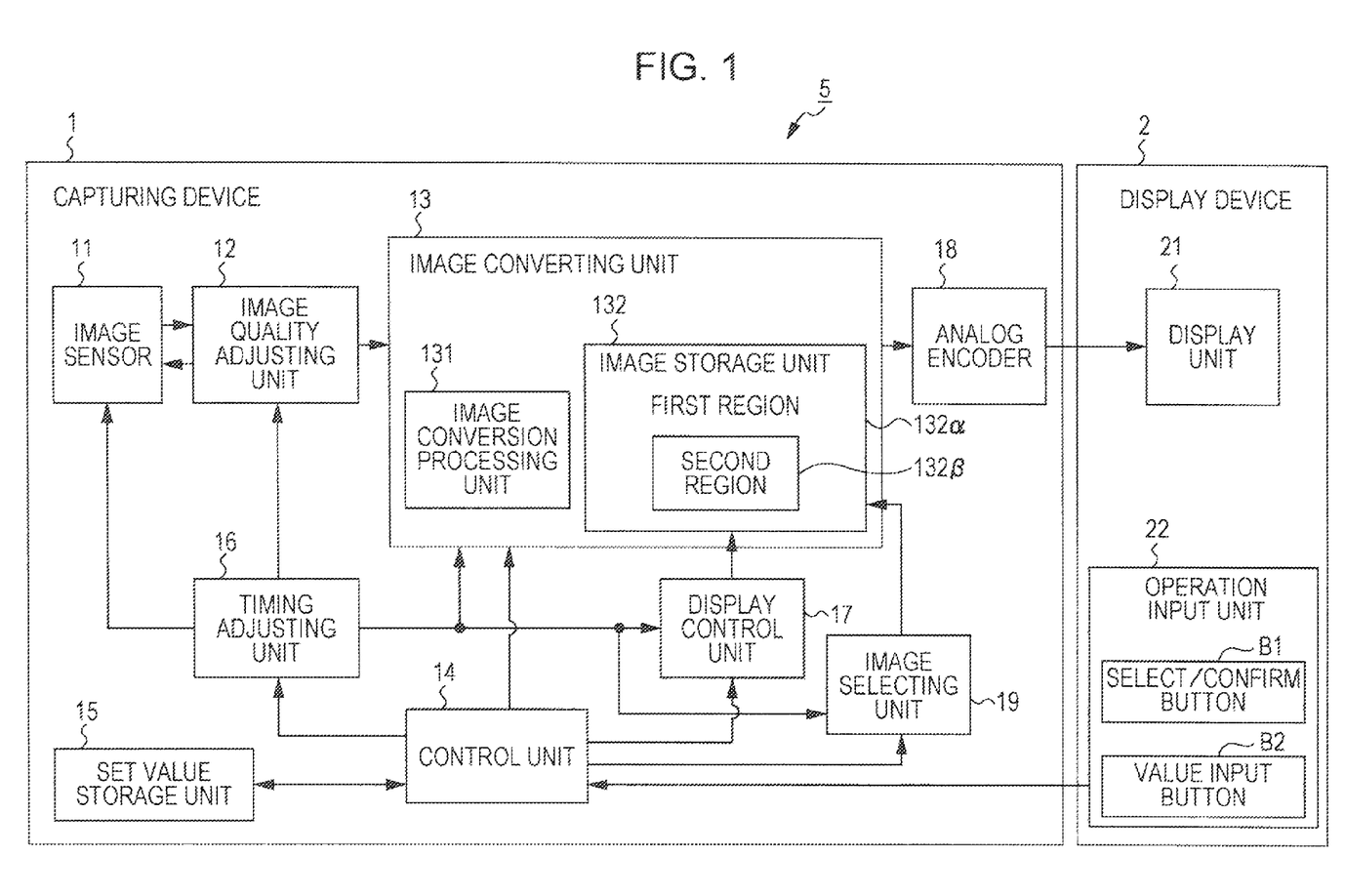
FIG. 1 is a block diagram illustrating an example of internal configurations of a capturing device and a display device according to an embodiment of the invention.

FIG. 1 is a diagram illustrating an example of configurations of a capturing device 1 and a display device 2 in a capturing system 5 according to an embodiment of the invention. According to the embodiment, the capturing device 1 exemplifies a vehicle-mounted camera which is mounted on the rear of the vehicle (not shown), and the display device 2 exemplifies a display device such as a car navigation device mounted on the vehicle. The capturing device 1 and the display device 2 are connected via a cable (not shown) or the like, and capturing system 5 is configured so that an image signal is input from the capturing device 1 to the display device 2 and a control signal is input from the display device 2 to the capturing device 1.

Moreover, according to the embodiment, an example in which the capturing device 1 is mounted on the vehicle is shown. However, the embodiment is not limited to this. That is, the capturing device 1 according to the embodiment of the invention may be mounted on a vehicle body or a ship body of other vehicles such as rail vehicles, heavy machinery including mobile cranes, industrial machines, or yachts.

First, components of the display device 2 will be described. The display device 2 includes a display unit 21 and an operation input unit 22. An LCD (Liquid Crystal Display) or the like, for example, is adopted as the display unit 21, and displays the image signal transmitted from the capturing device 1 as an image. The operation input unit 22 generates the control signal according to the content of a button pressing operation performed by a user on a select/confirm button B1 used for selecting display screen settings, and supplies a set value of an image to be selected by the capturing device 1 to a control unit 14.

Moreover, the operation input unit 22 includes a value input button B2 as well as the select/confirm button B1 to select and set an image of "a localized spot that is particularly desired to be seen" depending on the content of the button pressing operation performed by the user and set a unique display in advance to be stored. Accordingly, a user request can be made by a simple operation of pressing the select/confirm button B1 as necessary. Hereinafter, a display mode set in advance in this display method is called a "personal view mode".

Particularly, in a case where a simultaneous operation of a long press of the select/confirm button B1 and the value input button B2 is performed by the user, the operation input unit 22 generates an interruption request signal for a transition to a setting menu of the "personal view mode" and supplies the signal to the capturing device 1. By the user performing the operation of continuously pressing the select/confirm button B1 and the value input button B2 by using the settings menu (first instruction input), the control signal is generated to confirm a control set value for a cut-out position or a partial enlargement and stores the value in a set value storage unit 15. In addition, the value is supplied to the capturing device 1 to perform settings for the unique display of the "personal view mode".

In addition, in a case where pressing of the select/confirm button B1 is detected in the capturing device 1 in the state where the "personal view mode" is set by the above-described method, the following process is performed. That is, the operation is regarded as a second instruction input, and a control signal for reading out an image of a region set in the "personal view mode" is generated.

The "personal view mode" is considered to be an example of making a spot that is difficult for a particular user to see easier to see. However, the "personal view mode" may apply a display in a PinP format by setting a region which is registered in advance when a capturing device is designed or manufactured.

Moreover, in the example illustrated in FIG. 1, the display unit 21 and the operation input unit 22 are separately provided in the display device 2. However, a display device using a touch panel or the like in which the display unit 21 and the operation input unit 22 are integrated may also be applied.

Next, each unit of the capturing device 1 will be described. The capturing device 1 includes an image sensor 11, an image quality adjusting unit 12, an image converting unit 13, the control unit 14, the set value storage unit 15, a timing adjusting unit 16, a display control unit 17, an analog encoder 18 (output unit), and a region selecting unit 19.

The image sensor 11 is adopted as a solid-state imaging device. As the image sensor 11, for example, a CCD (Charge Coupled Device Image Sensor) or a CMOS (Complementary Metal Oxide Semiconductor Image Sensor) is used. The image sensor 11 performs photoelectric conversion on light from a subject in the vicinity of a vehicle body or a ship body on which the capturing device 1 is mounted, the light being imaged on a wide-angle lens (not shown), to generate an image signal. The image signal obtained by the image sensor 11 is supplied to the image quality adjusting unit 12. The image quality adjusting unit 12 converts the supplied image signal into a digital image signal to perform image quality adjustment. As the image quality adjustment, for example, AGC (Automatic Gain Control), noise reduction, image quality enhancement, and the like are performed. In addition, the image quality adjusting unit 12 controls operations of the image sensor 11. In addition, control for adjusting image quality of images obtained from first and second image signals to be written in first and second regions 132α and 132β that will be described later is performed separately on the first and second image signals at a timing at which the image signal is loaded from the image sensor 11 for each frame. The timing is based on a reading timing supplied from the timing adjusting unit 16. The image signal subjected to image quality adjustment by the image quality adjusting unit 12 is supplied to the image converting unit 13.

The image converting unit 13 includes an image conversion processing unit 131 and an image storage unit 132 and performs conversion adjustment into a format for outputting the image in a standard output format, for example, an NTSC format. The image storage unit 132 has the first region 132α for storing the first image signal corresponding to the full image from the image signal input from the image sensor 11 and the second region 132β for storing the second image signal corresponding to a partial image that is a part of the full image. The image storage unit 132 sets the second region 132β in the first region 132α according to a region specified by the set value generated by the control unit 14 for setting a range to cut the image from the image signal.

In addition, the capturing device 1 is provided with the first region 132α and the second region 132β in the image storage unit 132 and also provided with the region selecting unit 19 for selecting a region in which the image is to be written. A conversion image for outputting an image on the full screen of the display unit 21 is stored in the first region 132α, and a conversion image for displaying an image on a PinP small screen is stored in the second region 132β. By continuously reading out images in the image storage unit 132 at frame output timings, images output in the PinP output format as the standard output format can be obtained.

Hereinafter, detailed description will be provided. The image conversion processing unit 131 cuts an image in a specified region from an image of an image signal supplied from the image quality adjusting unit 12 on the basis of the control of the control unit 14. In addition, the cut image is enlarged to an image having a size of one screen of the display unit 21 of the display device 2. Here, the image conversion processing unit 131 performs a predetermined process on the image from the image signal read out from the image sensor 11. In addition, by adjusting timing, the image signal is written in the first region 132α at a different frame rate at which the image signal is written for each frame. This is performed on the first image signal corresponding to the full image from the image signal input from the image sensor 11 or on the second image signal corresponding to the partial image which is a part of the full image. On the other hand, the image signal which is different from the image signal written in the first region is written in the second region 132β at a time of the next frame, or at a timing satisfying a time-series order of the reading timing of the frame. The cut and enlarged image is output to the image storage unit 132. The image storage unit 132 is also a frame memory for holding the image signal supplied from the image conversion processing unit 131 for a predetermined period.

As described above, the image converting unit 13 which has a function of generating and outputting a distortion conversion image from the wide-angle image in the capturing device 1 and embeds an image of the partial designated region in the part of the image region for outputting the full image so as to be stored. Since the image loaded from the image sensor 11 through the wide-angle lens of the capturing device 1 which is not shown is significantly distorted, the image converting unit 13 performs a processing operation on the image signal to perform a converting process for distortion correction. Here, the specified region that is desired to be enlarged is enlarged in an address region designated as a sub-screen of the output image to be separately inserted and is stored in the second region 132β used as a buffer memory. In addition, when updating frames, the image is embedded to perform an output process at the rear of the camera to include the image, thereby implementing the PinP function.

An MPU (Micro-Processing Unit) is adopted as the control unit 14, for example. In addition, on the basis of the content of the control signal input from the operation input unit 22, the set value of the "personal view mode" for defining the range of the above-mentioned "specified region" as the above-mentioned "first instruction input" specified on the basis of the size and position of a window is generated and stored in the set value storage unit 15. That is, the set value is a set value for designating a range to cut the image from the image signal supplied from the image quality adjusting unit 12. The set value is obtained from a zoom ratio in the case where zoom is applied to a specified region and X-axis coordinates and Y-axis coordinates of the specified region. In addition, the control unit 14 includes a counter for counting the number of presses of the value input button 82 of the display device 2 and a timer for measuring time.

In addition, the control unit 14 reads out the set value from the set value storage unit 15 and outputs the set value to the image converting unit 13 in the case where the second instruction input is received from the operation input unit 22. In addition, the control unit 14 generates a control signal for adjusting an image signal output timing from the image sensor 11 and an image signal output timing from the image storage unit 132 and supplies the control signal to the timing adjusting unit 16. Moreover, the control unit 14 generates a control signal for outputting the image signal subjected to the image conversion by the image conversion processing unit 131 to the analog encoder 18 and supplies the control signal to the image conversion processing unit 131.

The region selecting unit 19 and the timing adjusting unit 16 read out the image signal from the image sensor 11 on the basis of the control signal supplied from the control unit 14 and adjust a timing for writing the image signal in the image storage unit 132 and a timing for reading out the image signal from the image storage unit 132. Processes performed by the timing adjusting unit 16 will be described later in detail with reference to FIG. 6.

The display control unit 17 reads out the images stored in the image storage unit 132 on the basis of the control signal supplied from the control unit 14 and according to the timing adjusted by the timing adjusting unit 16 and outputs the images to the analog encoder 18. In addition, the display control unit 17 generates a frame line or the like for setting a specified region and outputs the generated frame line to the analog encoder 18. Here, the display control unit 17 displays a window of which the size and position are changed in response to an operation input from the user on the display unit 21 for displaying the image from the image signal output from the output unit. In addition, the display control unit 17 displays the image cut as the specified region on the sub-screen of PinP. In addition, the display control unit 17 may be exemplified to display the image cut as the specified region on the full screen of PinP and display the image on the sub-screen to enable full comprehension thereof. However, an operation of setting the output screens to be reversed between PinP may also be performed.

The analog encoder 18 reads out a continuous scanning timing from the first and second regions 132α and 132β and converts image signals (the first and second image signals) into which the full image and the partial image are inserted in a predetermined format to be output. This format is, for example, the NTSC (National Television System Committee) format, and the analog encoder 18 supplies the image signal to the display unit 21 of the display device 2. The timing adjusting unit 16 adjusts an extension process of an image output timing to output the image at a timing that satisfies V synchronization based on the NTSC timing irrespective of whether or not the image is cut out. This adjustment is performed to adjust the image output timing due to the readout from the image sensor 11 and the image conversion by delaying the entire image frame.

Figure 2:
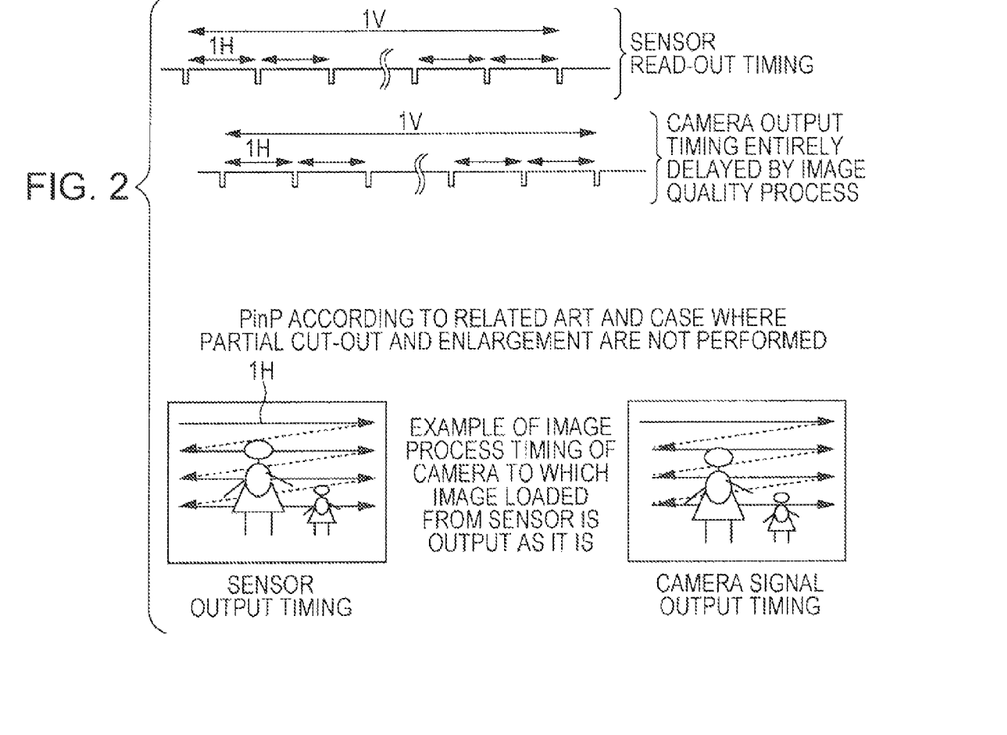
FIG. 2 is a diagram illustrating an example of a timing at which an existing image sensor reads out an image signal and a timing at which an existing capturing device outputs an image signal.

FIG. 2 is a diagram illustrating an example of a timing at which an existing image sensor reads out an image signal and a timing at which an existing capturing device outputs an image signal.

Here, the case where the existing capturing device 1 does not perform image distortion conversion, PinP, or cut-out or enlargement of a partial image is described.

The image sensor reads out an image signal in a line direction for each horizontal period (1H). The full horizontal line in a capturing region of the image sensor is read at a timing of one vertical period (1V). The image loaded from the image sensor 11 is output as it is to the outside of the capturing device without changing the size or the like of the image.

An image storage unit of the existing capturing device does not include the first and second regions 132α and 132β which correspond to the image storage unit 132 according to the embodiment. Here, since an image quality adjusting unit and an image converting unit perform their respective predetermined processes, a timing at which the capturing device 1 outputs an image signal is entirely delayed. As a result, timing adjustment is not necessary for each localized portion of the image.

Figure 3:
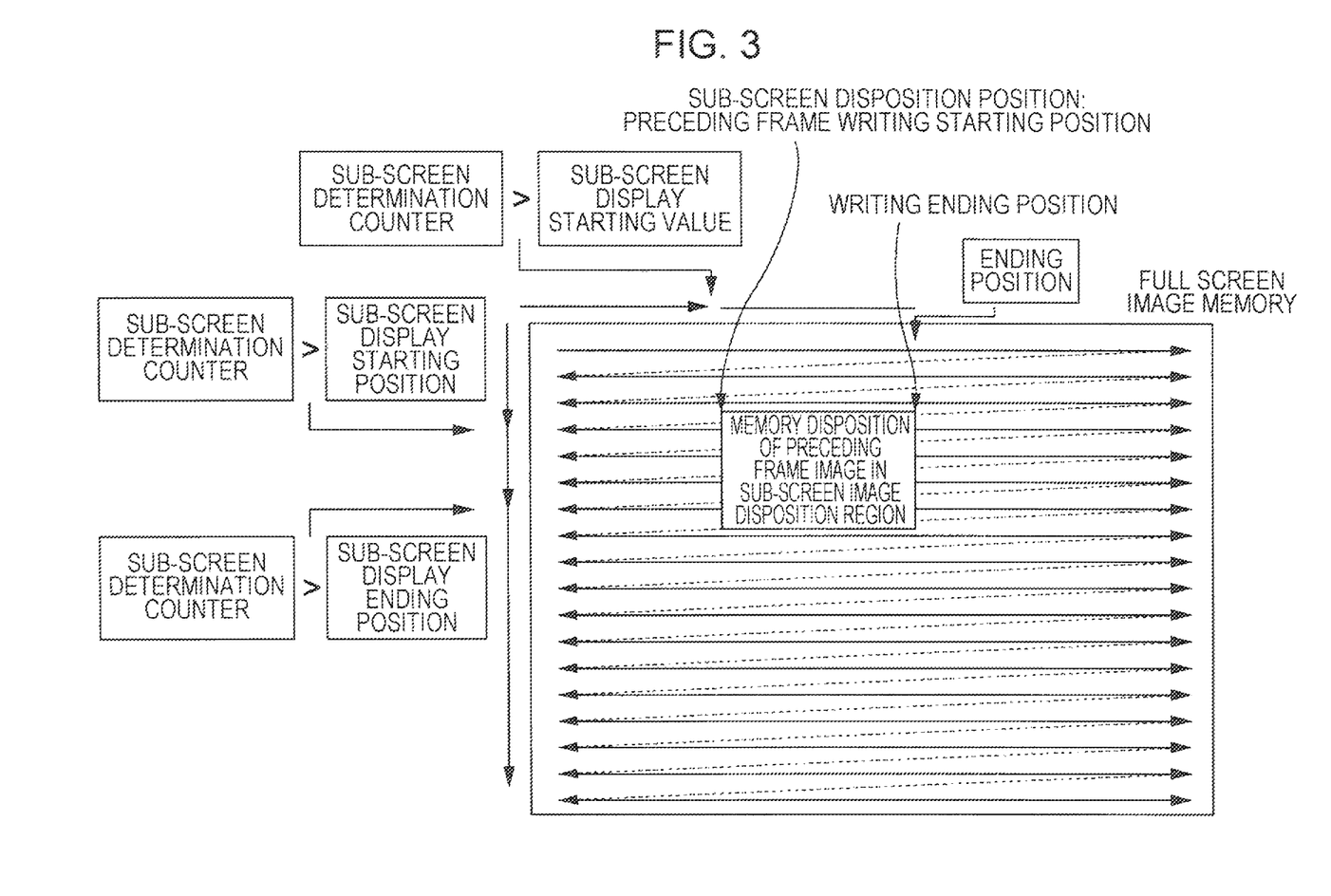
FIG. 3 is a diagram illustrating an example of images disposed in a first region and a second region.

FIG. 3 is a diagram illustrating an example of images disposed in the first and second regions 132α and 132β.

In the first region 132α, the conversion image to be output to the full screen of the display unit 21 is stored, and in the second region 132β, the conversion image to be displayed on the PinP small screen is stored. In the following description, the full screen of the display unit 21 is called a "main screen", and the region for displaying the partial image is called a "sub-screen". The image converting unit 13 holds information on the range of the horizontal and vertical regions of the sub-screen in advance.

In addition, when the image processed by the image conversion processing unit 131 is written in the image storage unit 132 for each line, a starting position and an ending position in which the sub-screen is displayed are obtained, and the image signal of the sub-screen is written in the second region 132β for each line. Here, writing the image signal in the first and second regions 132α and 132β is performed according to the value of a sub-screen determination counter (not shown) included in the image converting unit 13. The sub-screen determination counter is a counter for counting the image signal written for each pixel in the horizontal direction and counting the image signal written for each line in the vertical direction.

Since the writing is performed even in the vertical direction, when the value of the sub-screen determination counter becomes greater than the line corresponding to the display starting position of the sub-screen, the image signal of the sub-screen is written in the second region 132β. In addition, when the value of the sub-screen determination counter becomes greater than the ending position of the sub-screen display, the writing in the second region 132β is terminated.

Moreover, the image signal written in the first region 132α is a current frame, but the image signal written in the second region 132β is the immediately preceding frame. The process of outputting the image signal of the current frame and the immediately preceding frame by dividing the single image storage unit 132 into two regions will be described with reference to FIGS. 4A to 5.

Figure 4A:
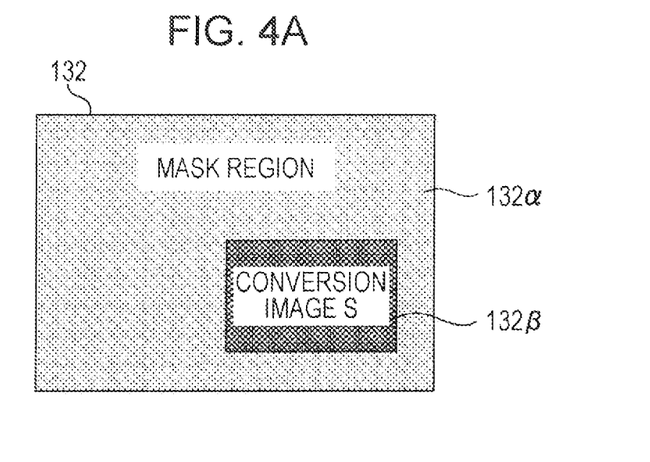
FIGS. 4A to 4C are diagrams illustrating examples of processes of writing conversion images in the first and second regions.
Figure 4B:
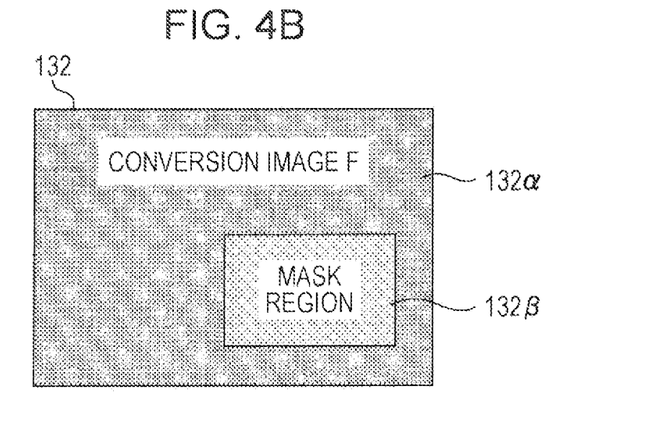
Figure 4C:
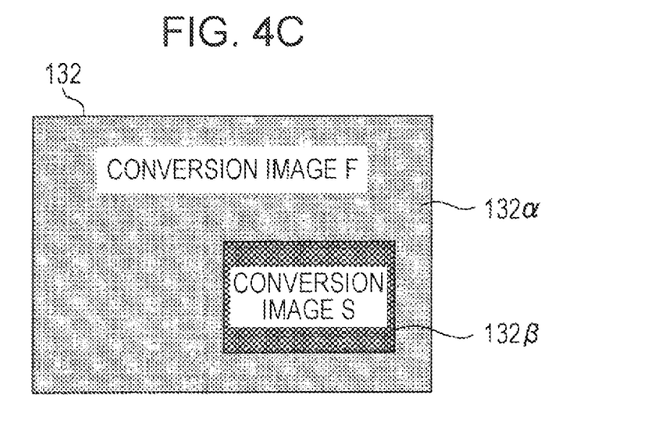

FIGS. 4A to 4C are diagrams illustrating examples of processes of writing conversion images in the first and second regions 132α and 132β. First, as illustrated in FIG. 4A, a conversion image S to be output on the PinP small screen is written in the second region 132β. The first region 132α is a mask region in which no image is written. Next, as illustrated in FIG. 4B, the conversion image F to be output on the full image is written in the first region 132α. At this time, the second region 132β is a mask region such that no image is written therein.

The conversion image F to be output on the full image and the conversion image S to be output on the small image which are written as described above are alternately output from the analog encoder 18 for each frame as the region selecting unit 19 drops the frame rates by ½. That is, the conversion images are updated once for two frames. By performing such processes, as illustrated in FIG. 4C, the conversion image F to be output on the full screen and the conversion image S to be output on the small screen, which are different images in terms of time, are synthesized to be output.

With such a configuration, for example, an image taken in a normal mode may be displayed on the full screen of the display unit 21, and an image of a specified region Pa (see A of FIG. 6) in the personal view mode may be displayed on the small screen of PinP. As the images are output to be fitted in both regions for each output frame, the user can check the enlarged image of the specified region Pa while seeing the normal image taken by the capturing device 1. Therefore, circumstances in the vicinity of the vehicle can be easily recognized. In addition, in the configuration according to the embodiment, without using, on the outside of the capturing device 1, a device for generating PinP or performing a synthesizing process and an additional memory necessary for performing the operation of the device, or the like, a plurality of image storage units 132 corresponding to the number of regions are not provided. Accordingly, the number of components of the system for monitoring the vicinity of the vehicle which includes the capturing device 1 and the display unit 21 can be reduced, thereby reducing cost of the system.

Example of Image Conversion Processing Performed by Image Conversion Processing Unit 131

Figure 5:
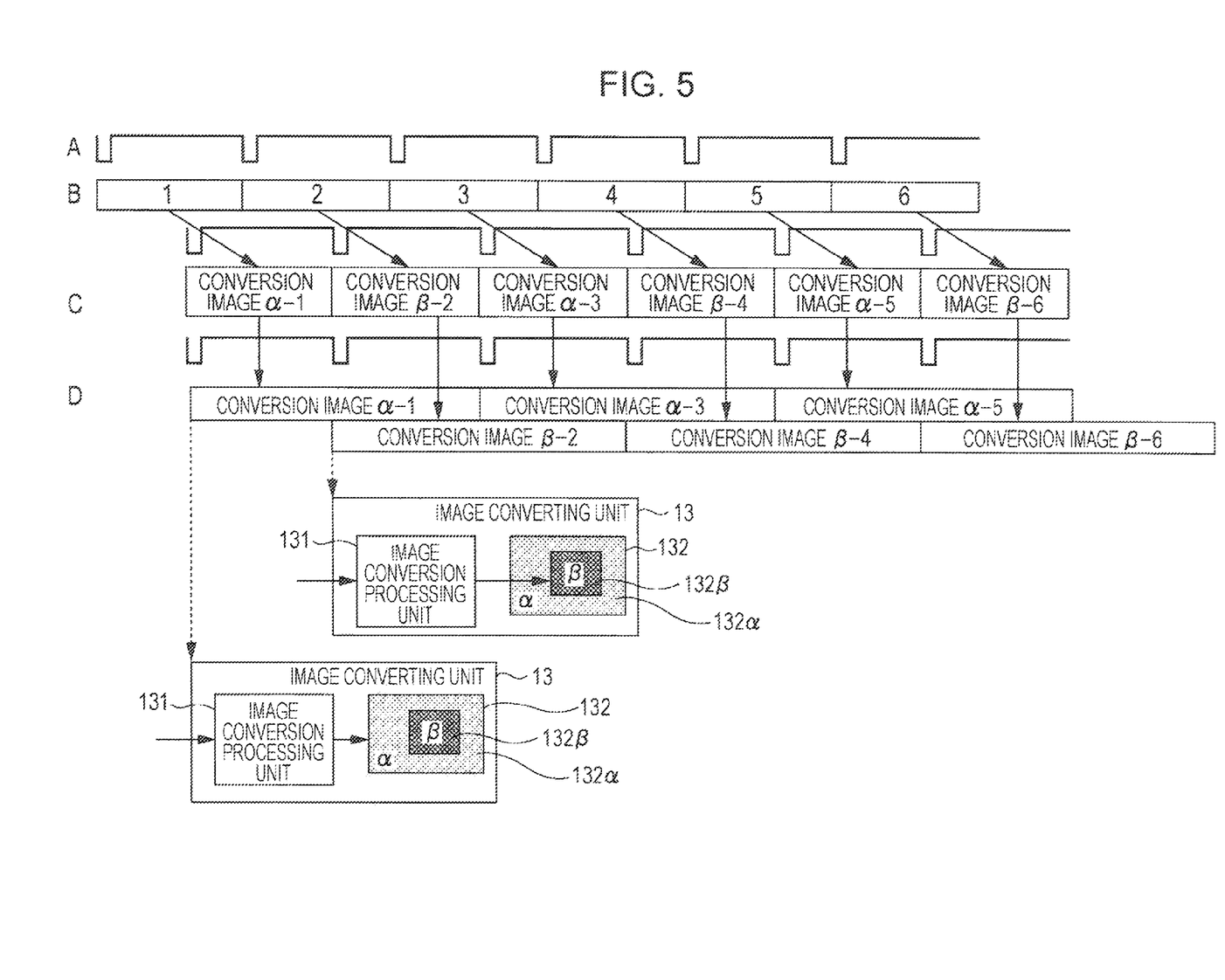
FIG. 5 is a diagram illustrating examples of image conversion processes performed by an image conversion processing unit according to the embodiment of the invention.

FIG. 5 is a diagram illustrating examples of timings for converting an image.

A of FIG. 5 illustrates an example of a reading timing of the image read out from the image sensor 11.

Here, the image is read out from the image sensor 11 frame by frame.

B of FIG. 5 illustrates an example in which images read for each frame are denoted by reference numerals.

C of FIG. 5 illustrates an example of conversion images input to the image converting unit 13. Processing is performed by the image quality adjusting unit 12 between the image sensor 11 and the image converting unit 13, so that images are input to the image conversion processing unit 131 later than the timing at which the images are read from the image sensor 11.

D of FIG. 5 illustrates an example of reading timings of images.

The image conversion processing unit 131 extends the frame rate of the full image by two times or the partial image of the input image taken for each frame, and the timings at which the full image and the partial image are written in the image storage unit 132 are caused to be different by one frame. In this example, the full image is represented as a conversion image α-n, and the partial image is represented as a conversion image β-n (n is a natural number).

The image conversion processing unit 131 writes the full image in the first region 132α and writes the partial image in the second region 132β. In addition, the region selecting unit 19 reads the full image and the partial image for a time corresponding to two frames. In addition, the timings at which the full image and the partial image are read by the region selecting unit 19 from the image storage unit 132 are different by one frame. Accordingly, the PinP image displayed on the display unit 21 is displayed as two types of image which are different by only one frame.

As described above, with regard to outputting of the conversion images, since the images are updated once every two frames, images which are different in terms of time are synthesized to be output. Accordingly, the image sensor 11 can output the image for each frame without a decrease in frame rate. Each frame output is 30 fps (frame/sec) in the NTSC format and although there is a time difference, there is no problem for practical use. In addition, in order for the capturing device 1 to output images, the capturing system 5 for continuously outputting images at a reference vertical synchronization timing such as an NTSC analog output can be configured.

Moreover, the image conversion processing unit 131 may write the second image signal in the first region 132α and write the first image signal in the second region 132β. Here, the analog encoder 18 displays the full image on the sub-screen of PinP from among the screens displayed on the display unit 21 and displays the partial image on the main screen.

Example of Timing Adjustment Process Performed by Timing Adjusting Unit 16

FIGS. 6 to 9 illustrate examples of timing adjustment processes performed by the timing adjusting unit 16 in the case where a part of the image is enlarged to be displayed.

Figure 6:
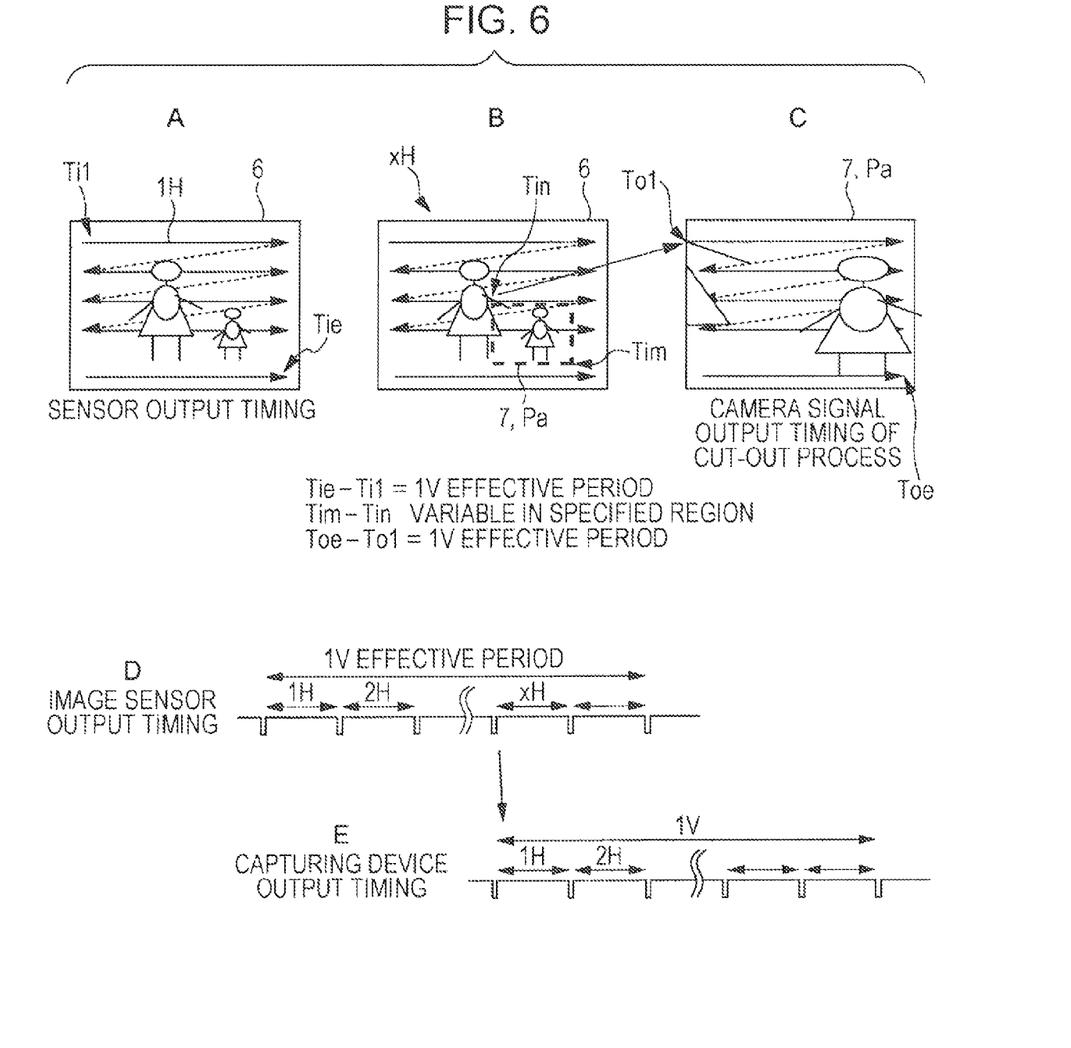
FIG. 6 is a diagram illustrating examples of processes performed by a timing adjusting unit according to the embodiment of the invention.

A of FIG. 6 illustrates a timing at which an image signal is read out from the image sensor 11 using the full image 6.

In A of FIG. 6, from among pixels of one frame, a timing at which an initial pixel (the pixel on the upper left of the screen) is read out is referred to as a timing Ti1, and a timing at which a last pixel (the pixel on the lower right of the screen) is read is referred to as a timing Tie. After the initial pixel is read at the timing Ti1, for a period of a horizontal scanning period 1H, pixels in one line of the pixel at the right end of the screen are sequentially read. In addition, the second line is read after the first line. As such, the pixels are sequentially read until the final line is reached, thereby reading all pixels of one frame. That is, when the image signal is read from the image sensor 11 as illustrated in A of FIG. 6, a period calculated as (timing Tie-timing Ti1) is 1V effective period.

B of FIG. 6 illustrates an example of a partial image 7 in the region set as a specified region Pa in the "personal view mode".

In B of FIG. 6, the specified region Pa is shown by a broken line. A timing at which a pixel at the upper left end of the specified region Pa is read out is referred to as a timing Tin, and a timing at which a pixel at the lower right end thereof is read out is referred to as a timing Tim. A period that can be calculated as (timing Tim-timing Tin) is changed depending on the size of the specified region Pa. In this example, the partial image 7 in the specified region Pa is cut out, and the cut-out image is output on the display device 2 for the 1V effective period.

C of FIG. 6 illustrates an example of an output timing of an image to the display device 2.

In C of FIG. 6, a timing at which an initial pixel is output on the display device 2 in the case where the partial image 7 in the specified region Pa is focused on is referred to as a timing To1, and a timing at which the last pixel is output on the display device 2 is referred to as Toe.

D of FIG. 6 illustrates an example of a timing at which the image sensor 11 outputs an image signal.

Here, in one vertical period, a first horizontal period is referred to as "1H", a second horizontal period is referred to as "2H", and an x-th horizontal period is referred to as "xH".

E of FIG. 6 illustrates an example of a timing at which the capturing device 1 outputs an image signal.

Due to the image quality process and the image cutting process, the timings at which the capturing device 1 outputs image signals are entirely delayed. However, in order for the partial image to be extended and output at the timing of the first vertical period, the images are held in the image storage unit 132 used as a buffer memory.

In the case where the partial image 7 in the specified region Pa illustrated in B of FIG. 6 is output for the 1V effective period shown as (timing Toe-timing To1), outputting of the partial image 7 corresponding to the specified region Pa may be delayed in the 1V effective period. Moreover, since a delay in performing the image adjustment process by the image quality adjusting unit 12 is added, the timing at which the image signal is output from the capturing device 1 illustrated in D of FIG. 6 is delayed by a predetermined period from the reading timing of the image sensor 11 illustrated E of in FIG. 6.

Accordingly, the timing adjusting unit 16 adjusts the reading timing of the image signal from the image sensor 11 or the reading timing of the partial image from the image storage unit 132 in order to implement delaying and outputting of the partial image 7 of the specified region Pa.

Figure 7:
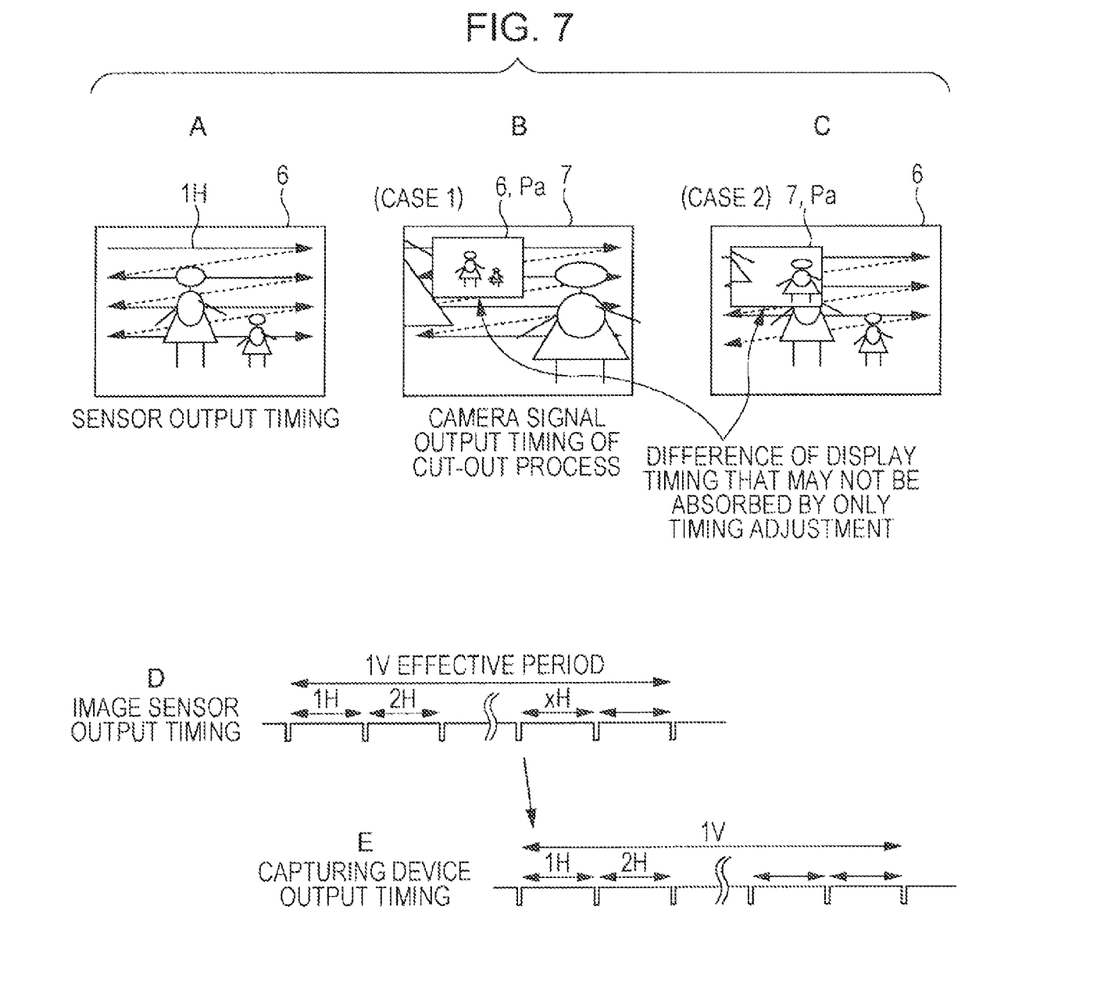
FIG. 7 is a diagram illustrating examples of timing adjustment performed in a case where a partial image is enlarged to be displayed by performing PinP according to the embodiment of the invention.

FIG. 7 illustrates examples of timing adjustment performed in the case where a partial image is enlarged to be displayed using PinP.

A, D, and E of FIG. 7 illustrate, as in A, D, and E of FIG. 6, an example of a sensor output timing at which the image sensor 11 outputs an image signal and a camera output timing at which the capturing device 1 outputs an image signal on the display device 2. However, timing adjustment in the case where the partial image is enlarged to be displayed using PinP may not be determined evenly.

B of FIG. 7 illustrates an example in which the full image 6 is reduced to be displayed in the specified region Pa and the partial image 7 is displayed on the full screen (first case).

C of FIG. 7 illustrates an example in which the partial image 7 is reduced to be displayed in the specified region Pa and the full image 6 is displayed on the full screen (second case).

Figure 8:
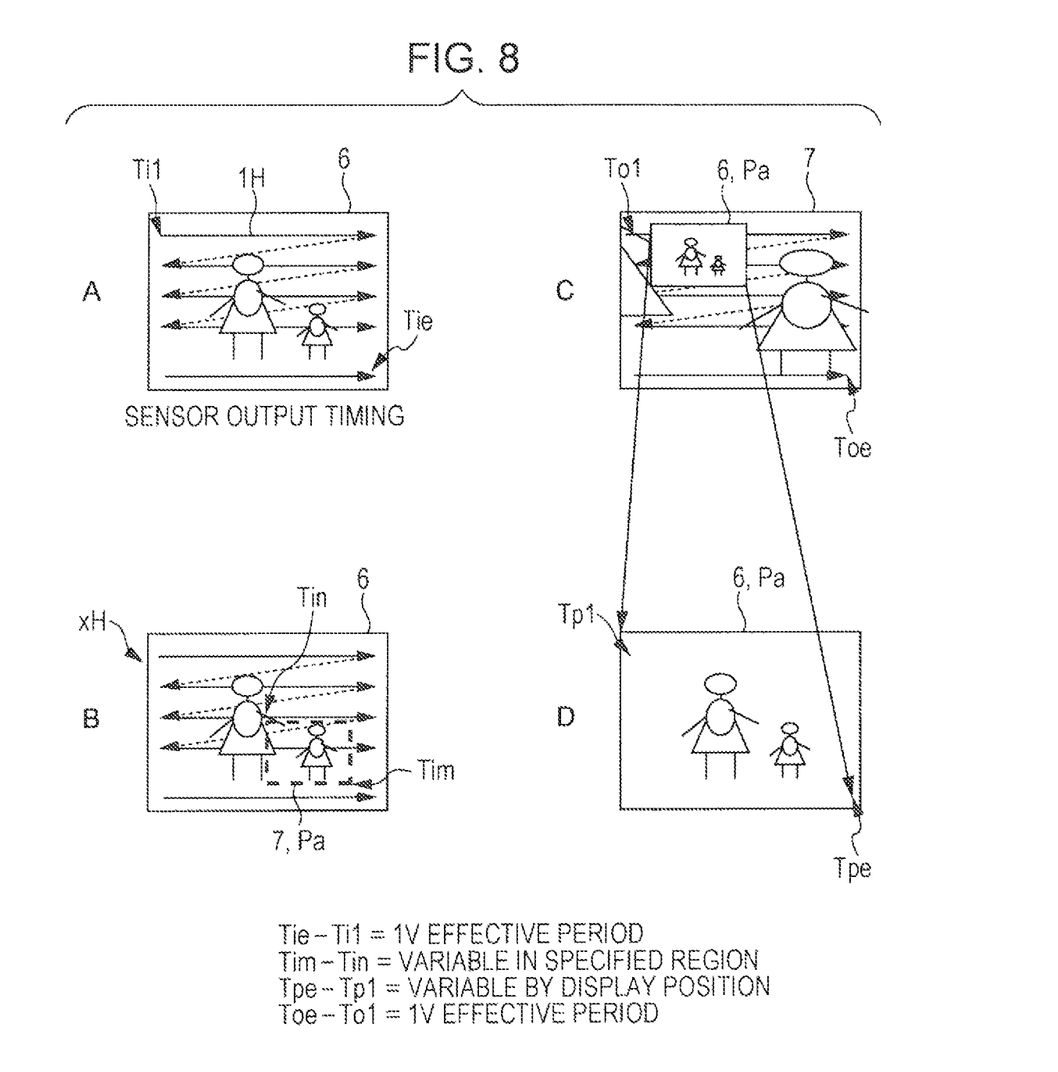
FIG. 8 is a diagram illustrating examples of timing adjustment performed in a case where a partial image is enlarged to be displayed by performing PinP according to the embodiment of the invention (first case).
Figure 9:
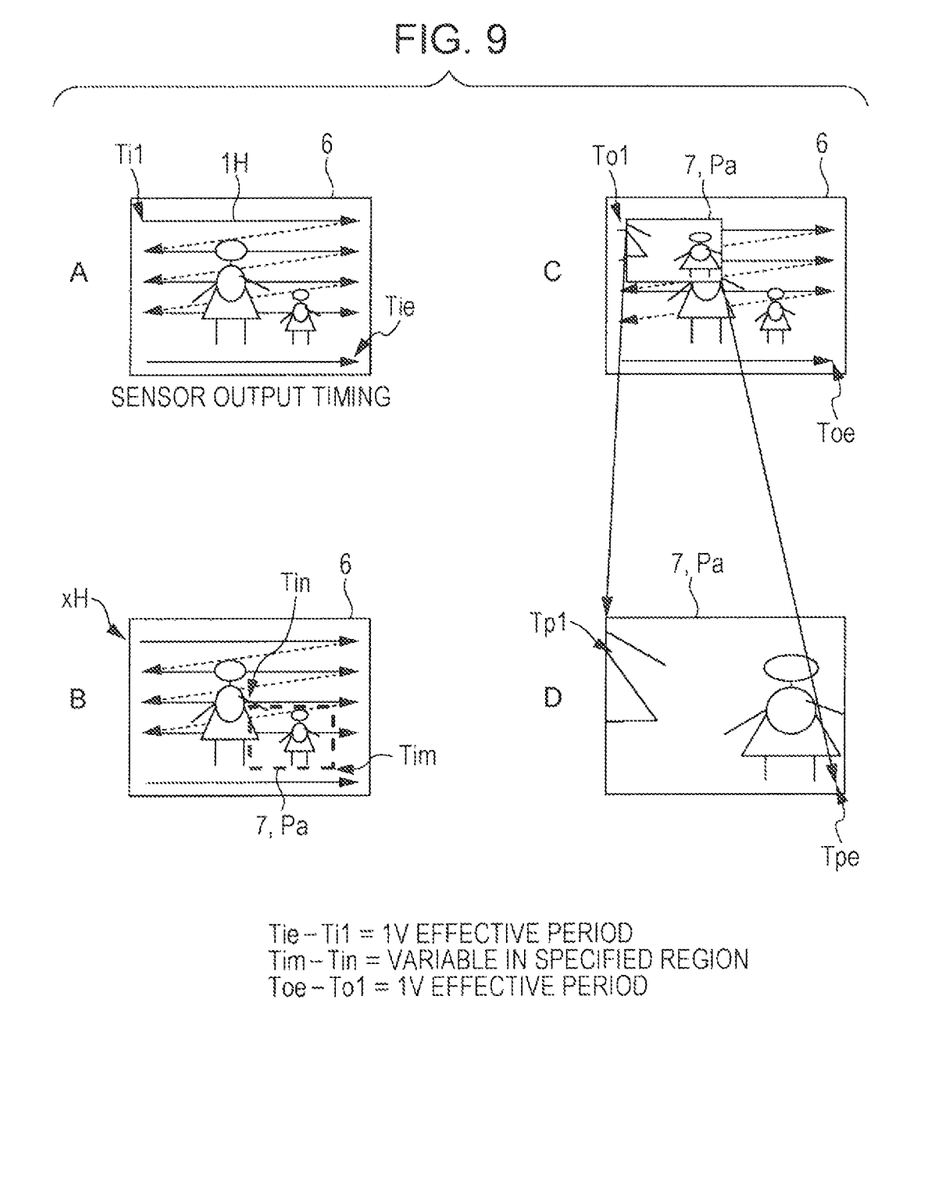
FIG. 9 is a diagram illustrating examples of timing adjustment performed in a case where a partial image is enlarged to be displayed by performing PinP according to the embodiment of the invention (second case).

In this case, a difference between display timings may not be absorbed by only performing the timing adjustment, so that timings are adjusted as illustrated in FIGS. 8 and 9.

FIG. 8 illustrates an example of timing adjustment in the case where a partial image is enlarged to be displayed as PinP (first case). The display control unit 17 displays a second image cut as a specified region on the full screen of Picture in Picture and displays a first image on the sub-screen.

A of FIG. 8 illustrates an example of the timing at which the image sensor 11 outputs an image signal.

As described above, the 1V effective period is obtained by the following expression.

$$Tie-Ti1=1V \text{ effective period}$$

B of FIG. 8 illustrates an example of a region in which the partial image 7 is set.

As described above, the specified region Pa in which the partial image 7 is set can be varied. In addition, a variable effective period of the partial image 7 is obtained by the following expression.

$$Tim-Tin=\text{variable effective period}$$

C of FIG. 8 illustrates an example of a display of screens displayed as PinP.

In PinP display, the reduced full image 6 is displayed on the specified region Pa in the partial image 7 displayed on the full screen. The timing adjusting unit 16 adjusts a writing timing of an image using a timing adjustment function, and the region selecting unit 19 extends and outputs the image from the image storage unit 132 on the basis of an instruction of the timing adjusting unit 16. Here, when a display starting timing of the partial image 7 enlarged to be displayed is referred to as To1 and a display ending timing thereof is referred to as Toe, the 1V effective period is obtained by the following expression.

$$Toe-To1=1V \text{ effective period}$$

D of FIG. 8 illustrates an example in which the full image 6 is enlarged to be displayed.

Here, when a display starting timing of the full image 6 is referred to as Tp1 and a display ending timing thereof is referred to as Tp, the 1V effective period is obtained by the following expression. Moreover, the display starting timing Tp1 and the display ending timing Tpe are variable values depending on disposition positions of PinP.

$$Tpe-Tp1=1V \text{ effective period}$$

FIG. 9 illustrates an example of timing adjustment in the case where the partial image is enlarged to be displayed using PinP (second case). The display control unit 17 displays the second image cut as the specified region on the sub-screen of Picture in Picture.

A and B of FIG. 9 illustrate, as in A and B of FIG. 8, examples of the sensor output timing and the camera output timing.

C and D of FIG. 9 illustrate an example of displaying the full image 6 on the full screen.

As illustrated in C of FIG. 9, when a display starting timing of the full image 6 is referred to as To1 and a display ending timing is referred to as Toe, the 1V effective period is obtained by the following expression.

$$Toe-To1=1V \text{ effective period}$$

As illustrated in D of FIG. 9, the display starting timing Tp1 and the display ending timing Tpe of the partial image 7 displayed on the specified region Pa are variable values depending on disposition positions of PinP.

$$Tpe-Tp1=1V \text{ effective period}$$

Figure 10:
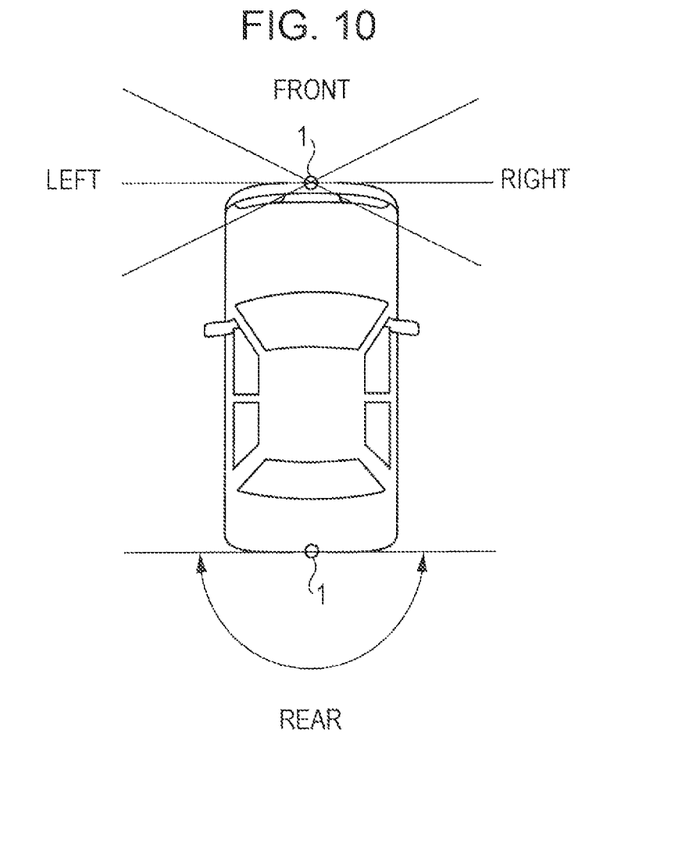
FIG. 10 is a diagram illustrating an example of a vehicle provided with a capturing device in top plan view according to the embodiment of the invention.

FIG. 10 illustrates an example of a vehicle provided with the capturing device 1 of this embodiment in top plan view.

The capturing device 1 is provided in a bonnet unit on a front side of the vehicle and in a trunk unit on a rear side thereof, and the display unit 2 is provided in the front of the vehicle near the driver's seat. The capturing devices 1 provided on the front side and the rear side both have a capturing angle of about 180 degrees.

Figure 11A:
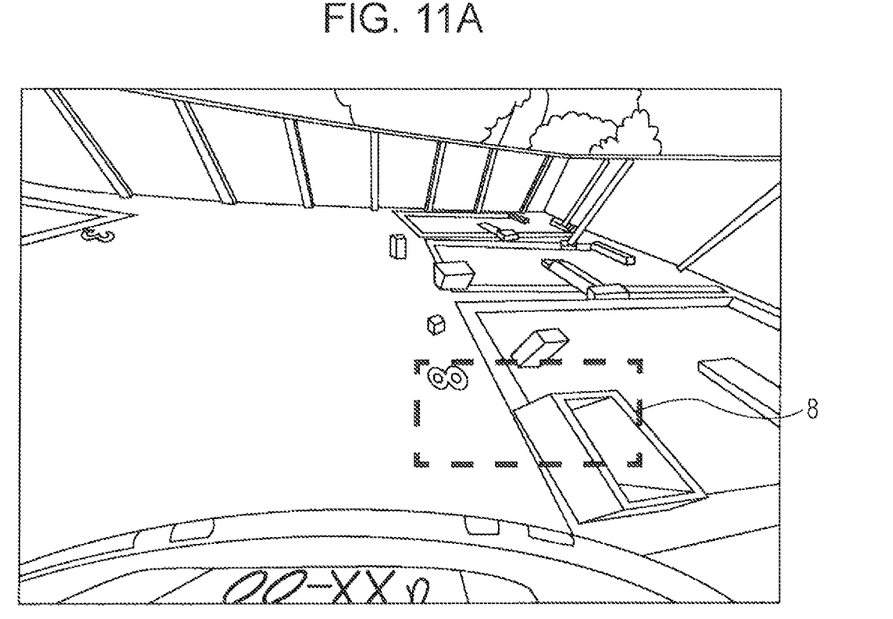
FIGS. 11A and 11B are diagrams illustrating examples of images displayed on a display unit according to the embodiment of the invention.
Figure 11B:
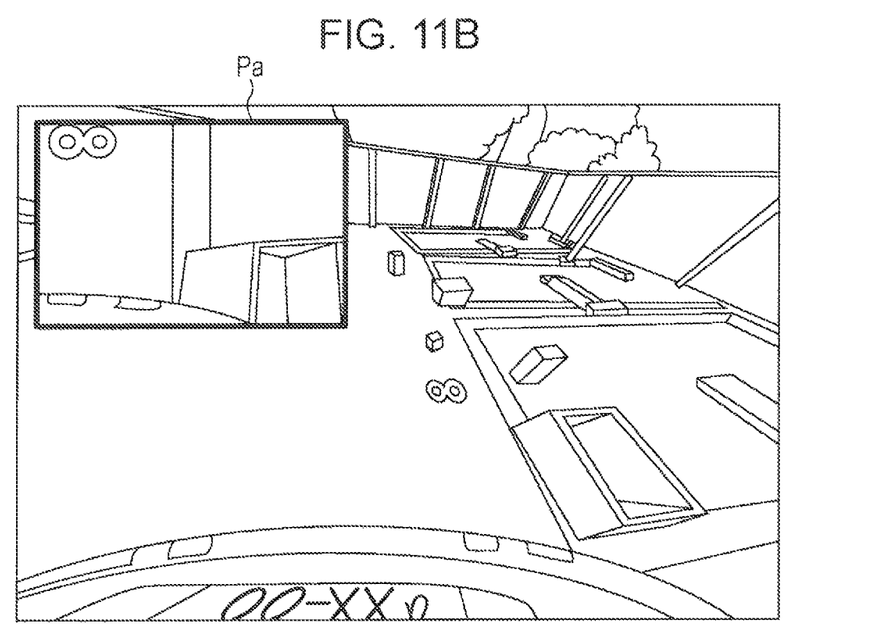

FIGS. 11A and 11B illustrate an example of an image displayed on the display unit 21.

FIG. 11A illustrates an example of a full screen display in a state where image conversion or the like is not performed.

In this example, the image captured by the capturing device 1 provided on the rear side of the vehicle is displayed. Since the lens used in the capturing device 1 has a high curvature, image distortion becomes particularly significant in the peripheral portions of the display unit 21. Accordingly, it is difficult for the user to recognize a positional relationship of a focused region 8.

FIG. 11B illustrates an example of a PinP display.

In this example, while displaying the full screen, a PinP image subjected to the image conversion processing to remove the distortion of the region 8 is displayed on the specified region Pa positioned on the upper left of the display unit 21. As such, using the PinP display, the user can accurately recognize the state of region 8 and thus is able to park the vehicle back in a garage or the like.

In the capturing system 5 according to the embodiment described above, a portion of the image loaded from the same image sensor 11 is taken so that any one of the full image or the partial image is generated as the sub-screen thereby implementing the PinP display. However, in order to display the full image and the partial image, timings at which the images are displayed after being subjected to the image conversion may be adjusted by at least two systems. Accordingly, when the PinP display function is implemented using the sub-screen of PinP, a memory region in which the image information is disposed on the sub-screen side is ensured by the image storage unit 132 as the second region 132β to insert in advance the image acquired from the full screen into the second region 132β to be disposed. Accordingly, the adjustment of the timings may not be separately performed by the two systems in the process of outputting the full screen and the sub-screen. As described above, in sequential reading addresses of the "full image memory" used by the capturing device 1 for displaying the full screen, the image of a preceding frame is reduced and displayed in an address region corresponding to the display position of PinP.

In addition, an output of each conversion image is updated once every two frames. Therefore, images which are different in terms of time by one frame are synthesized to be output to the display unit 21. Accordingly, the frame rates of the images output by the image sensor 11 are not dropped, and it becomes possible to output the image of every frame to the display unit 21. In addition, in order for the capturing device 1 to output the image to the display device 2, a system can be configured for continuously outputting images at a reference vertical synchronization timing such as an NTSC analog output or the like.

As such, the capturing device 1 can be mounted on a vehicle to monitor the surroundings with the PinP function and capture a wide angle. It is difficult to recognize the details of a localized image in a wide-angle image, and even when a specified spot that the user particularly wants to see exists, details may not be recognized from the image as it is or it may take time for the user to recognize the details. However, the driver has to determine dangerous objects promptly while driving. However, for this demand, by providing a function setting in advance the partial image in the corresponding specified region Pa from the wide-angle image loaded from the capturing device 1 and displaying the corresponding spot on the sub-screen as PinP on the capturing device 1 side, the driver can easily recognize the state. The driver can observe the focused region more specifically with the full screen and thus easily and promptly recognizes the state of the surroundings.

In addition, the capturing device 1 is provided with the PinP function for disposing the sub-screen on the same screen output via the capturing device 1, and the driver or the like can designate the sub-screen with the partial image of a spot that is difficult to see in the full image. Alternatively, it may be possible to display the full image on the sub-screen and display the enlarged and detailed image of a specified spot on the full image. In addition, by setting the full image and the partial image onto the same screen substantially simultaneously as PinP and transmitting the screen to the display device 2, the entire surroundings and details of the specified spot can be simultaneously recognized.

In addition, since the images are updated once every two frames, times at which images are read by the image quality adjusting unit 12 are different, and the images are adjusted to have optical image quality for every region caused by other capturing regions, thereby allowing the capturing device 1 to output each conversion image. In addition, by the PinP operation method implemented by writing frames alternately in the image storage unit 132, optimization processing such as exposure control may be additionally performed on each region. Generally, when regions which are significantly different in brightness are displayed as PinP, there may be a case where a part of the image becomes extremely dark or extremely bright. However, by performing control for adjusting the displayed image to have optical image quality for each region, it becomes possible to adjust the brightness of the image from the image signal written in each region for each frame. Accordingly, the capturing device 1 can output an image so that the driver easily recognizes the entire state.

In addition, in the capturing devices mounted on the vehicle to monitor the surroundings that have been developed up until now, a monitoring region is set in advance for the purpose of observing a specified region set in a manufacturing process. There are products in which management regions are viewed and designated in a factory default step. However, there is no product in which a monitoring region is designated in consideration of a state where it is difficult for the driver to see the surroundings due to the driving environment. On the other hand, according to the capturing system 5, the driver can designate a region that is difficult for the driver to see while driving and hold the designated region, so that, for example, while parking in a narrow space at home, monitoring of the surroundings can be very effectively performed.

2. Modified Example

Moreover, as illustrated in FIGS. 4A to 4C, as well as the configuration in which display control of the PinP screen is performed using the single image storage unit 132, a configuration in which a plurality of image storage units 132 corresponding to the number of regions is provided may also be applied.

It should be understood by those skilled in the art that various modifications, combinations, sub-combinations and alterations may occur depending on design requirements and other factors insofar as they are within the scope of the appended claims or the equivalents thereof.

The invention claimed is:
1. A capturing device comprising:
an image sensor that performs photoelectric conversion on light from a subject and generates an image signal at a first frame rate;
a storage unit that has a first region for storing a first image signal corresponding to a full image from the image signal input from the image sensor and a second region for storing a second image signal corresponding to a specified image specified by a set value for enlarging an image from the image signal;
a timing adjusting unit that adjusts a timing at which the image signal is read out from the image sensor to write the image signal in the storage unit, and a timing at which the image signal is read out from the storage unit;
an image conversion processing unit that performs a predetermined process on the image from the image signal read out from the image sensor and alternately writes the first image signal corresponding to the full image and the second image signal corresponding to a partial image which corresponds to the specified image every one frame according to the timings adjusted by the timing adjusting unit;
an output unit that converts the first and second image signals read out from the first and second regions at continuous scanning timings into an image signal in a predetermined format and outputs the converted image signals; and
a display control unit that controls the image conversion processing unit to write the first image signal of a given frame of the full image into the first region of the first region of the storage unit and to write the second image signal of a different frame of the partial image into the second region of the storage unit,
wherein the first and second image signals are read out from the first and second regions, respectively, of the storage unit at a second frame rate reduced by half of the first frame rate.

2. The capturing device according to claim 1, wherein the display control unit causes the display of a window of which a size and position are changed in response to an operation input from a user on a display unit for displaying the image from the image signal output from the output unit, and
wherein the display control unit generates the set value on the basis of the size and position of the window.

3. The capturing device according to claim 2, further comprising an image quality adjusting unit that performs control of an operation of the image sensor and performs different controls for adjusting image quality of the images from the first and second image signals written in the first and second regions on the first and second image signals at a timing at which the image signal is loaded from the image sensor for each frame.

4. The capturing device according to claim 3,
wherein the display control unit displays the second image enlarged as the specified region on a picture in picture sub-screen.

5. The capturing device according to claim 3,
wherein the display control unit displays the second image enlarged as the specified region on a picture in picture full screen and displays the first image on the sub-screen.

6. The capturing device according to claim 2, wherein the image conversion processing unit writes the second image signal in the first region and writes the first image signal in the second region.

7. The capturing device according to claim 4, wherein the capturing device is mounted on a vehicle body or a ship body, and the image sensor performs photoelectric conversion on light from a subject in the vicinity of the vehicle body or the ship body and generates the image signal.

8. A capturing system comprising:
a capturing device according to claim 1, and a display device which includes a display unit displaying an image from an image signal output from the output unit.

9. A capturing method comprising the steps of:

generating an image signal by performing photoelectric conversion on light from a subject at a first frame rate;

storing a first image signal corresponding to a full image from the generated image signal in a first region of a storage unit;

storing a second image signal corresponding to a specified image specified by a set value for enlarging an image from the generated image signal in a second region of the storage unit;

adjusting a timing at which the image signal is read out from an image sensor to write the image signal in the storage unit, and a timing at which the image signal is read out from the storage unit;

performing a predetermined process on the image from the image signal read out from the image sensor;

alternately writing the first image signal corresponding to the full image and the second image signal corresponding to the specified image every one frame;

converting the first and second image signals read out from the first and second regions at continuous scanning timings into an image signal in a predetermined format; and outputting the converted image signals;

wherein the first and second image signals are read out from the first and second regions, respectively, of the storage unit at a second frame rate reduced by half of the first frame rate.

\* \* \* \* \*